(12) United States Patent
Li (10) Patent No.: US 11,126,272 B2
(45) Date of Patent: Sep. 21, 2021

(54) SINKABLE KEYBOARD DEVICE

(71) Applicant: Chicony Electronics Co., Ltd., New Taipei (TW)

(72) Inventor: Po-Hsin Li, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 155 days.

(21) Appl. No.: 16/545,991

(22) Filed: Aug. 20, 2019

(65) Prior Publication Data

US 2020/0333887 A1 Oct. 22, 2020

(30) Foreign Application Priority Data

Apr. 17, 2019 (TW) .................................. 108113473

(51) Int. Cl.
*G06F 3/02* (2006.01)
*G06F 1/16* (2006.01)

(52) U.S. Cl.
CPC .......... *G06F 3/0216* (2013.01); *G06F 3/0221* (2013.01); *G06F 3/0224* (2013.01); *G06F 1/1671* (2013.01)

(58) Field of Classification Search
CPC .... G06F 3/0205; G06F 3/0216; G06F 3/0224; G06F 3/02–027; G06F 1/1662–1671
See application file for complete search history.

(56) References Cited

U.S. PATENT DOCUMENTS

| | | | | |
|---|---|---|---|---|
| 7,022,927 B2* | 4/2006 | Hsu | ....................... | G06F 1/1615 |
| | | | | 200/344 |
| 7,034,718 B2* | 4/2006 | Hsu | ....................... | G06F 1/1616 |
| | | | | 200/344 |
| 8,890,014 B1* | 11/2014 | Chen | ..................... | G02B 6/0041 |
| | | | | 200/314 |
| 2010/0142138 A1* | 6/2010 | Wang | .................... | G06F 1/1666 |
| | | | | 361/679.13 |
| 2015/0092331 A1* | 4/2015 | Kinoshita | ............. | G06F 1/1616 |
| | | | | 361/679.09 |
| 2016/0161987 A1* | 6/2016 | Jacobs | .................. | G06F 1/1662 |
| | | | | 361/679.11 |
| 2016/0266657 A1* | 9/2016 | Li | .......................... | G06F 3/0221 |
| 2018/0122595 A1* | 5/2018 | Han | ..................... | H01H 13/702 |
| 2019/0377389 A1* | 12/2019 | Tamura | ................... | G06F 1/169 |

* cited by examiner

*Primary Examiner* — Sanjiv D. Patel
(74) *Attorney, Agent, or Firm* — Muncy, Geissler, Olds & Lowe, P.C.

(57) ABSTRACT

A sinkable keyboard device includes a substrate, keycaps, a slide plate, and a driving member. The keycaps are above the substrate and capable of lifting and sinking. Each keycap is provided with a first guide member. The slide plate is below and in parallel with the substrate. The slide plate includes a long side and a short side connected to the long side. The slide plate is provided with second guide members respectively corresponding to the first guide members. The driving member is on the short side of the slide plate. The driving member includes a driving motor. The driving motor drives the slide plate to slide relative to the substrate along the long side to make the second guide members respectively against the first guide members to drive the keycaps to relatively sink.

6 Claims, 7 Drawing Sheets

SINKABLE KEYBOARD DEVICE

CROSS-REFERENCE TO RELATED APPLICATION

This non-provisional application claims priority under 35 U.S.C. § 119(a) to Patent Application No. 108113473 filed in Taiwan, R.O.C. on Apr. 17, 2019, the entire contents of which are hereby incorporated by reference.

BACKGROUND

Technical Field

The instant disclosure relates to a keyboard device and, more particularly, to a sinkable keyboard device.

Related Art

A keyboard is a common input device of computer peripherals for inputting words or commands. Generally, the keyboard includes a bottom plate, keys assembled to the bottom plate, and a cover plate above the bottom plate. A keycap of each key is protruded from the surface of the cover plate, which allows a user to press and operate.

Nonetheless, if the keyboard is built on a portable electronic device (e.g., a laptop computer or a tablet computer), the keyboard is usually folded to close while there is no need to use the keyboard. For example, in a case of the laptop computer, the screen may be folded to cover the keyboard to be portable. In a case of the tablet computer, the keyboard may be folded or slid to the back of the touch screen to reduce the entire volume to be easily placed on a flat surface for use. Since the keycap of the keyboard is protruded from the surface of the cover plate in a state that the keycap can be forced to lift and sink while the keyboard is folded to close, the keycap may be easily abraded or be continuously pressed to cause trouble in use.

SUMMARY

To address the above issue, in an embodiment, a sinkable keyboard device is provided, which comprises a substrate, a plurality of keycaps, a slide plate, and a driving member. The keycaps are disposed above the substrate and capable of lifting and sinking. Each of the keycaps is provided with a first guide member. The slide plate is disposed below and in parallel with the substrate. The slide plate comprises a long side and a short side connected to the long side. The slide plate is provided with a plurality of second guide members respectively corresponding to the first guide members of the keycaps. The driving member is disposed on the short side of the slide plate. The driving member comprises a driving motor. The driving motor drives the slide plate to slide relative to the substrate along the long side to make the second guide members respectively against the first guide members of the keycaps to drive the keycaps to relatively sink.

Concisely, according to the embodiment of the instant disclose, the sinkable keyboard device can drive the slide plate to slide along the long side to drive the keycap to sink to be not protruded from the surface of the cover plate by the driving motor disposed on the short side of the slide plate, so as to improve the stability of the slide plate during sliding to avoid shifting or swaying.

DETAILED DESCRIPTION

Figure 1:
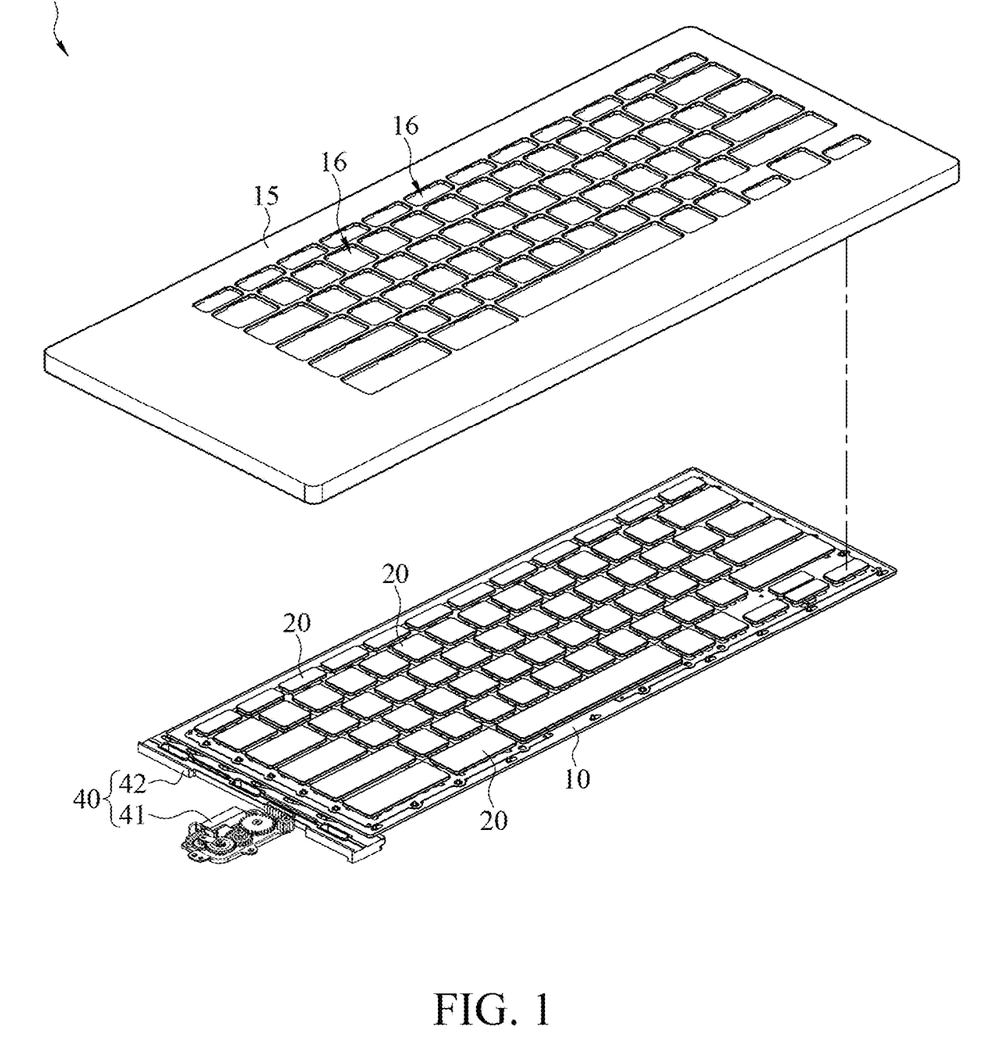
FIG. 1 illustrates an exploded, perspective view of a sinkable keyboard device according to an embodiment of the instant disclosure.
Figure 2:
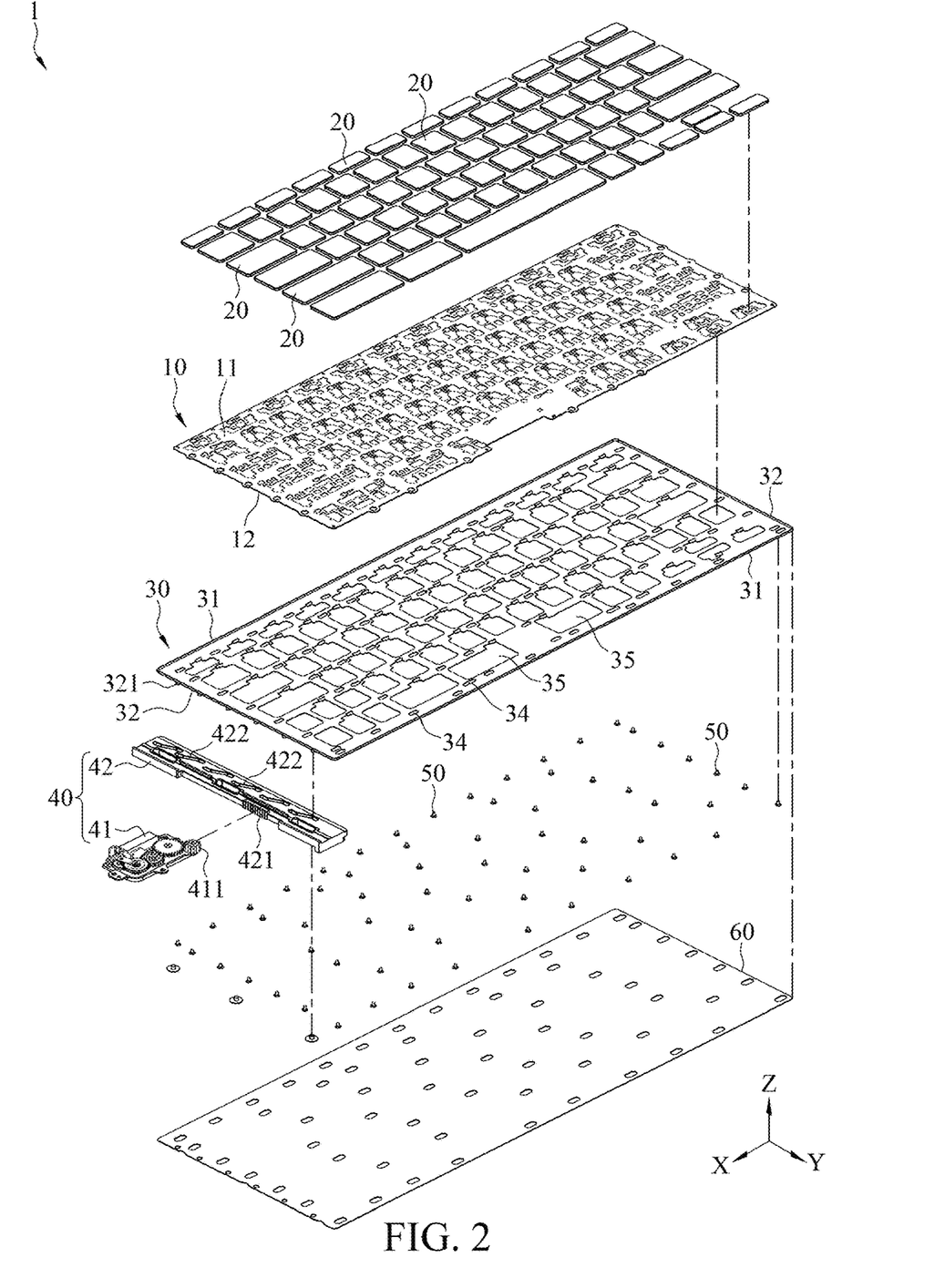
FIG. 2 illustrates another exploded, perspective view of the sinkable keyboard device according to an embodiment of the instant disclosure.
Figure 3:
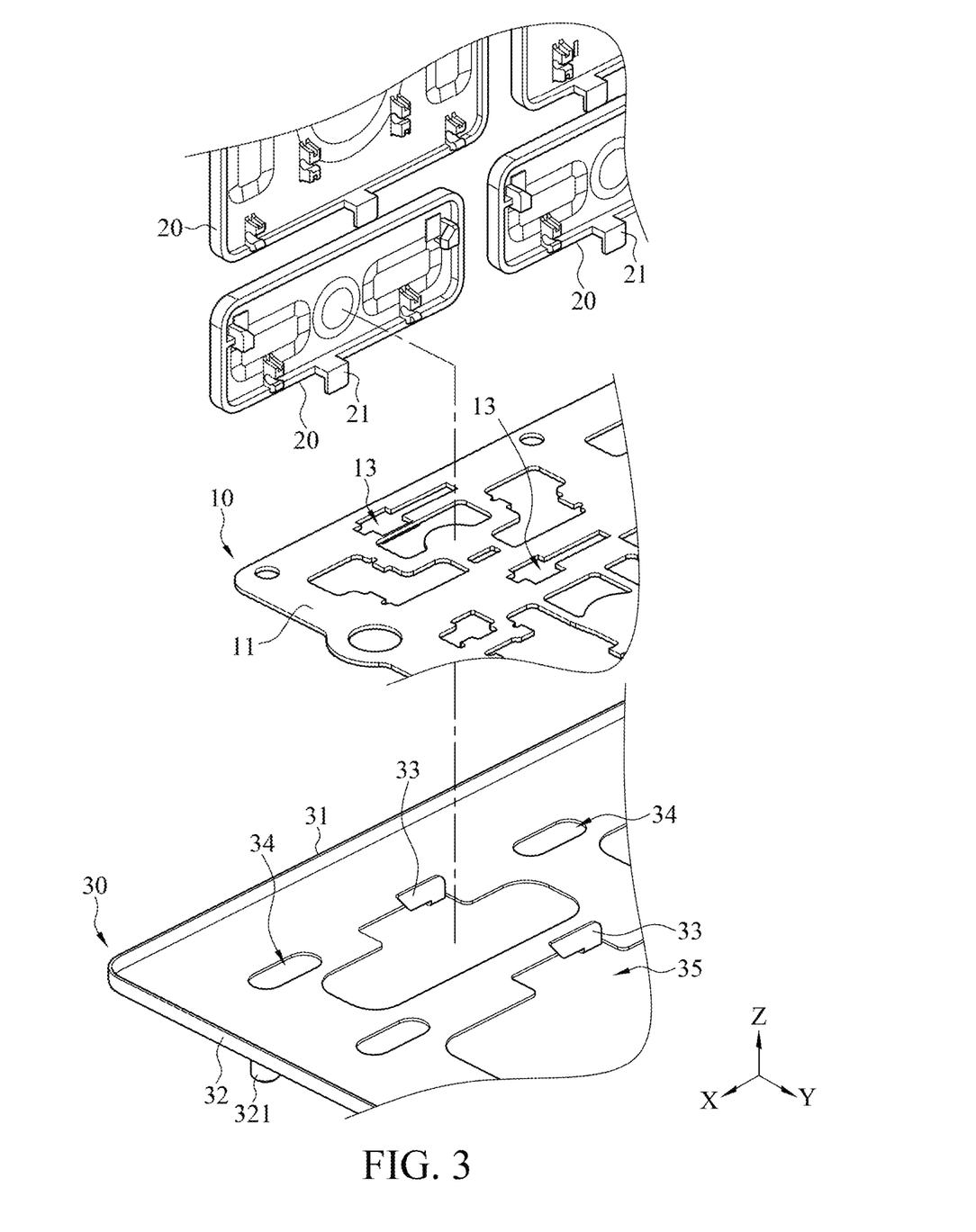
FIG. 3 illustrates an exploded, perspective view of a part of the sinkable keyboard device according to an embodiment of the instant disclosure.

As shown in FIG. 1 to FIG. 3, a sinkable keyboard device 1 of the embodiment comprises a substrate 10, a plurality of keycaps 20, a slide plate 30, and a driving member 40. The keycaps 20 are disposed above the substrate 10 and are capable of lifting and sinking. The driving member 40 is for driving the slide plate 30 to slide relative to the substrate 10 to drive the keycaps 20 to sink towards the substrate 10. In some embodiments, the sinkable keyboard device 1 may be a keyboard of a laptop computer, a keyboard of a desktop computer, or an external keyboard for being connected to a tablet computer.

As shown in FIG. 1 and FIG. 2, the substrate 10 has a top surface 11 and a bottom surface 12 opposite to each other. The top surface 11 may be provided with plural liftable structures (not shown) for being assembled to the keycaps 20. For instance, the liftable structure may comprise a scissor connector and an elastic component (e.g., an elastic rubber, an elastic sheet, or a mechanical switch). The keycaps 20 may comprise letter keys, number keys, a space key, an enter key, and a caps lock key. The keycaps 20 may be respectively assembled to the liftable structures to be connected to the substrate 10. In some embodiments, the substrate 10 may be a rigid plate made by metal (e.g., iron, aluminum, or alloy) or plastic material.

As shown in FIG. 1, an upside of the substrate 10 is further provided with a cover plate 15. The cover plate 15 has plural engraved holes 16 to respectively correspond to the keycaps 20, such that while each of the keycaps 20 is not pressed, each of the keycaps 20 can be protruded from the cover plate 15 through each of the engraved holes 16, which allows a user to press and operate, by the elastic components of the liftable structures below each of the keycaps 20 elastically abutting upwards. While any one of the keycaps 20 is pressed, the pressed keycap 20 can sink towards the substrate 10 by the guidance of the liftable structure.

As shown in FIG. 2 and FIG. 3, each of the keycaps 20 is further provided with a first guide member 21. In the embodiment, each of the first guide members 21 is, but not limited to, a plate extending from the same side of each of the keycaps 20. In other embodiments, each of the keycaps 20 may be extended with the first guide members 21 from different sides.

As shown in FIG. 2 and FIG. 3, the slide plate 30 is disposed below and in parallel with the substrate 10 and is capable of sliding relative to the substrate 10. In the embodiment, the slide plate 30 overlaps the bottom surface 12 of the substrate 10 and is below the substrate 10. By the slide plate 30 being disposed below the substrate 10 instead of being above the substrate 10, the upside of the substrate 10 can have sufficient space for receiving additional structure and is benefit to the assembling of each of the keycaps 20. In particular, since the space between the substrate 10 and the cover plate 15 is limited, if the slide plate 30 is disposed above the substrate 10 between the substrate 10 and the cover plate 15, the slide plate 30 may occupy the space for receiving additional structure and is against the assembling process of the structures on the substrate 10. In addition, the thickness of the slide plate 30 may be limited, which may result in insufficient strength. As a result according to the embodiment of the instant disclosure, the arrangement and the assembling space between the substrate 10 and the cover plate 15 can be improved. It is benefit to increase the structural strength of the slide plate 30 (for example, the thickness of the slide plate 30 can be increased according to the needs).

As shown in FIG. 2 and FIG. 3, in the embodiment, the slide plate 30 is a rectangular plate corresponding to the substrate 10 and has two long sides 31 and two short sides 32 respectively connected to ends of the two long sides 31. The length of each of the long sides 31 is greater than that of each of the short sides 32. An upper surface of the slide plate 30 is provided with a plurality of second guide members 33 respectively corresponding to the first guide members 21 of the keycaps 20. As shown in FIG. 3, in the embodiment, each of the second guide members 33 is a plate bent from the slide plate 30 upwards and integrally. The substrate 10 is provided with a plurality of through holes 13. The second guide members 33 of the slide plate 30 respectively penetrate through the through holes 13 upwards and are close to the first guide members 21. While the slide plate 30 slides relative to the substrate 10, each of the second guide members 33 may move simultaneously along each of the through holes 13 to be close to or away from each first guide member 21 of each of the keycaps 20. Nonetheless, the above embodiments are merely for illustration. In other embodiments, the second guide members 33 may be independent components assembled to the slide plate 30. Alternatively, the second guide members 33 may be formed on the slide plate 30 in an insert molding manner.

Figure 4:
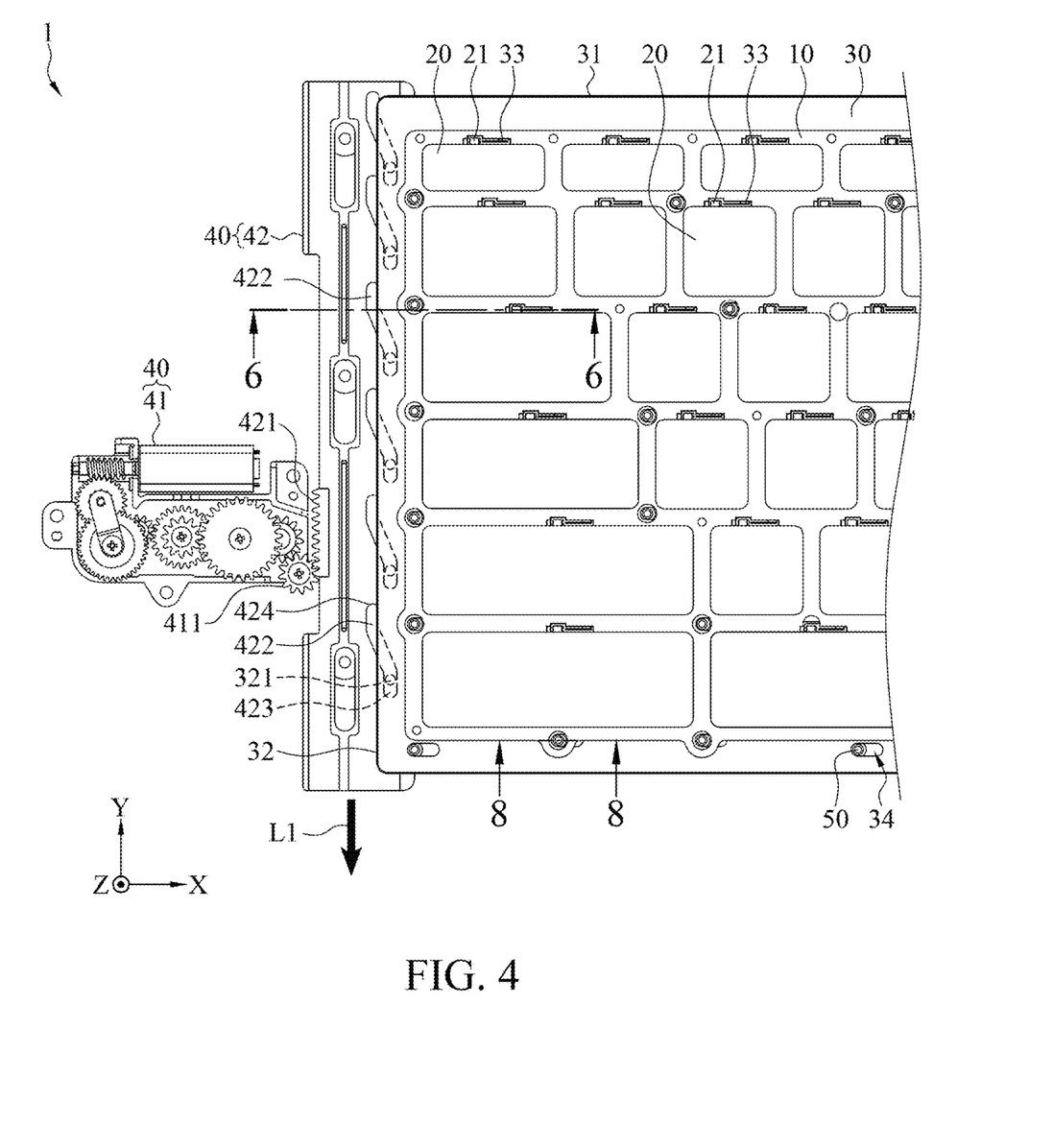
FIG. 4 illustrates a top view of a part of the sinkable keyboard device according to an embodiment of the instant disclosure.

As shown in FIG. 2 and FIG. 4, the driving member 40 is disposed on the short side 32 of the slide plate 30 for driving the slide plate 30 to slide relative to the substrate 10 along the direction of the long side 31. In the embodiment, the driving member 40 comprises a driving motor 41 and a driving rod 42. The driving rod 42 is connected between one of the short sides 32 of the slide plate 30 and the driving motor 41. The driving motor 41 drives the driving rod 42 to move relative to the slide plate 30 along the direction of the short side 32 (i.e., the extending direction of the short side 32, as the direction of Y axis in the drawing) to drive the slide plate 30 to slide relative to the substrate 10 along the direction of the long side 31 (i.e., the extending direction of the long side 31, as the direction of X axis in the drawing) by the driving rod 42.

For instance, as shown in FIG. 2 to FIG. 4, in the embodiment, the first guide members 21 provided on each of the keycaps 20 extend towards the direction of the short side 32 of the slide plate 30 (the direction of Y axis in the embodiment). The driving rod 42 is provided with a plurality of slide rails 422 extending along the direction of the short side 32. The slide rail 422 has a first end 423 and a second end 424. The first end 423 is close to the slide plate 30 relative to the second end 424. The driving rod 42 is provided with a gear rack 421 on a side thereof away from the slide plate 30. The gear rack 421 extends along the short side 32. The driving motor 41 has a transmission gear 411 to engage with the gear rack 421. The short side 32 of the slide plate 30 is provided with a plurality of slide blocks 321 to be slidably disposed in the slide rails 422, correspondingly and respectively.

Figure 5:
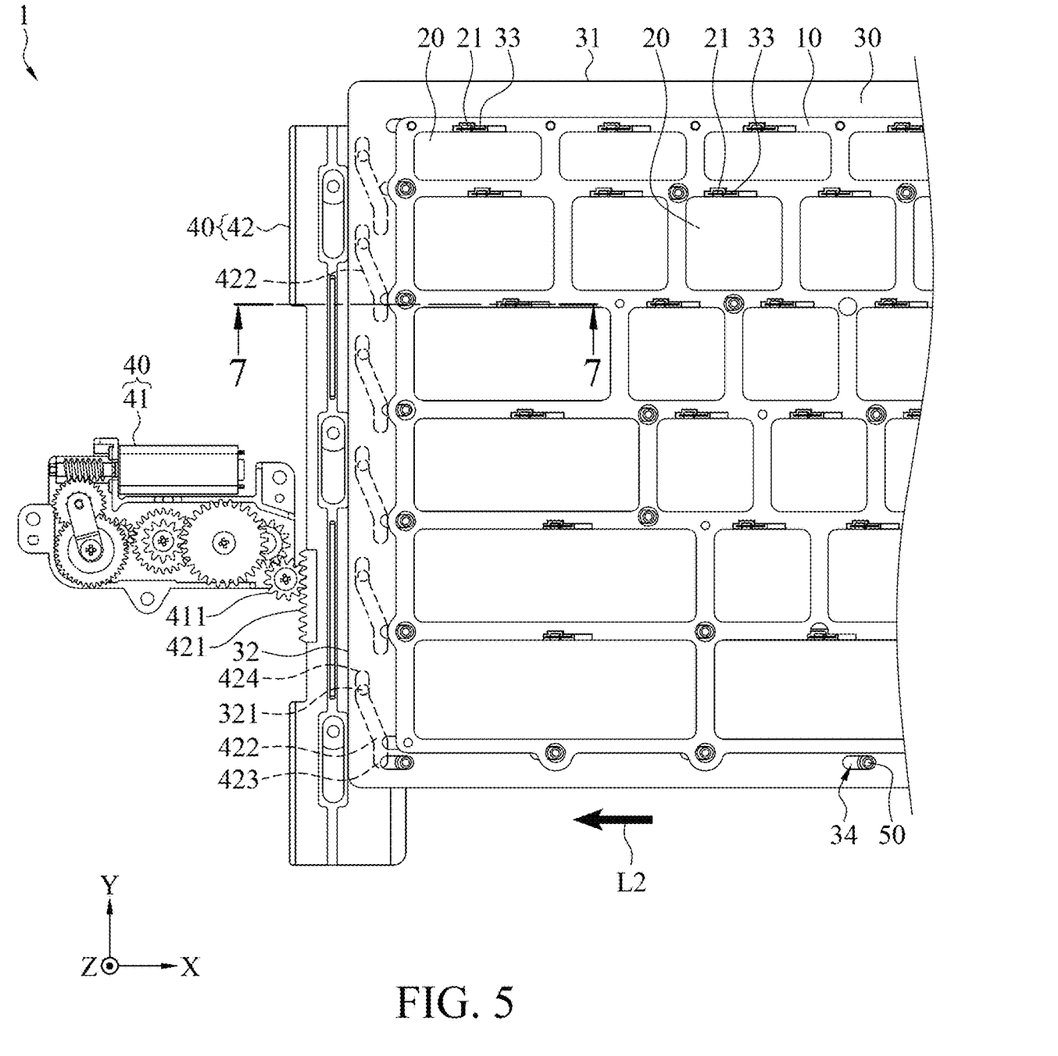
FIG. 5 illustrates a diagram of operation of FIG. 4.
Figure 6:
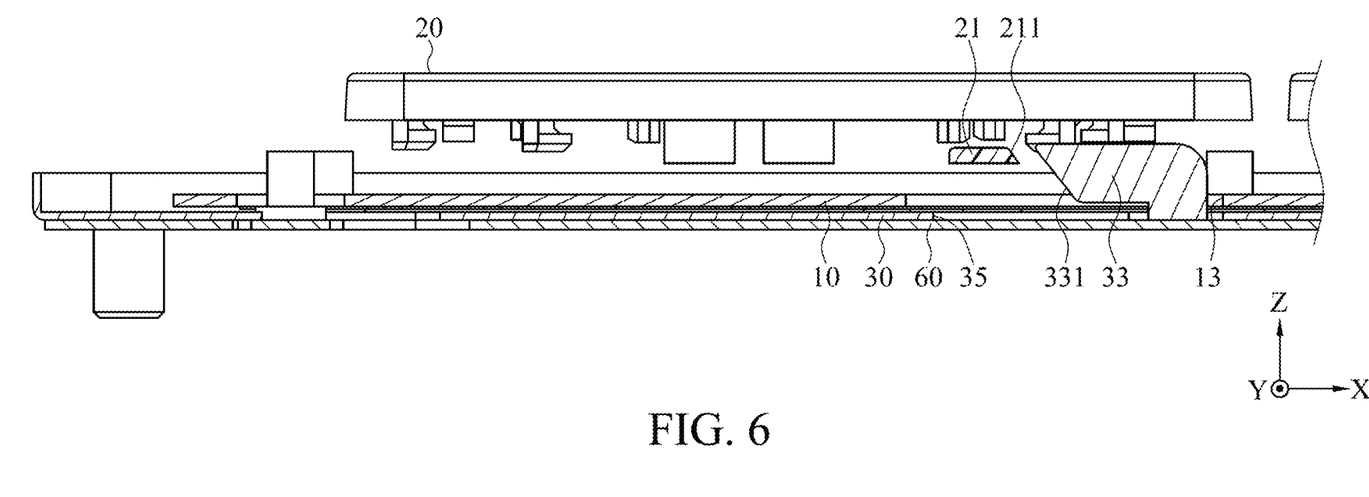
FIG. 6 illustrates a cross sectional view along line 6-6 of FIG. 4.

As aforementioned, as shown in FIG. 4 and FIG. 6, in the embodiment, while each of the keycaps 20 is not pressed, each of the slide blocks 321 of the slide plate 30 is at the first end 423 of each of the slide rails 422, and there is an interval kept between each first guide member 21 of each of the keycaps 20 and each second guide member 33 of the slide plate 30. While the driving motor 41 operates to make the transmission gear 411 rotate towards a first direction (the clockwise direction in the drawing), the driving rod 42 can be driven to move along the direction of the short side 32 (shown by the arrow L1). As a result, as shown in FG 5 and FIG. 7, each of the slide blocks 321 of the slide plate 30 may slide from the first end 423 of each of the slide rails 422 to the second end 424 to drive the slide plate 30 to slide relative to the substrate 10 along the direction of the long side 31 (shown by the arrow L2), so as to make the second guide members 33 of the slide plate 30 move simultaneously to respectively approach and be against the first guide members 21 to drive the keycaps 20 sink relatively towards the substrate 10. As a result, according to the embodiment of the instant disclosure, while there is no need to use the sinkable keyboard device 1, the driving motor 41 can be controlled to operate to make each of the keycaps 20 sink downwards to be not protruded from the surface of the cover plate 15 (please refer to FIG. 1), so as to prevent the keycaps 20 from being abraded by external objects or being pressed by accident. In contrast, as shown in FIG. 5 and FIG. 7, while the driving motor 41 operates to make the transmission gear 411 rotate towards a second direction (the counterclockwise direction in the drawing) opposite to said first direction, the driving rod 42 can be driven to move back to make each of the slide blocks 321 of the slide plate 30 slide from the second end 424 of each of the slide rails 422 to the first end 423 to drive the slide plate 30 to slide back relative to the substrate 10, so as to make the second guide members 33 of the slide plate 30 move simultaneously to be respectively away from the first guide members 21 to drive each of the keycaps 20 to move back into the state being not pressed and being able to be operated (as shown in FIG. 4 and FIG. 6).

As a result, according to the embodiment of the instant disclosure, by the driving member 40 being disposed on the short side 32 of the slide plate 30 capable of driving the slide plate 30 to slide along the direction of the long side 31, the stability of the slide plate 30 during sliding can be improved to avoid shifting or swaying. In particular, since the length of the short side 32 of the slide plate 30 is less than that of the long side 31, while the short side 32 of the slide plate 30 is applied with driving force generated by the driving member 40, the force can be evenly transmitted to the entire short side 32 to avoid the occurrence of local stress, so as to prevent the slide plate 30 from shifting or swaying during sliding. For instance, as shown in FIG. 4 and FIG. 5, in the embodiment, the driving motor 41 of the driving member 40 is close to the center of the short side 32 of the slide plate 30. While the driving motor 41 operates to apply force on the short side 32 of the slide plate 30, the force applied to the center of the short side 32 can be transmitted to two ends rapidly, such that the entire short side 32 is forced evenly to drive the slide plate 30 to move stably.

Nonetheless, the above embodiments are merely illustration. In other embodiments, the driving member 40 may merely include the driving motor 41. The driving motor 41 is directly connected to the short side 32 of the slide plate 30. For instance, the transmission gear 411 of the driving motor 41 engages with a tooth portion on the short side 32, such that while the driving motor 41 operates, the driving motor 41 can directly drive the slide plate 30 to slide relative to the substrate 10. In addition, there can be, but not limited to, other transmission mechanisms (e.g., belts, chains, or different types of gear sets) for driving disposed between the driving motor 41 and the driving rod 42 and between the driving rod 42 and the slide plate 30.

Figure 7:
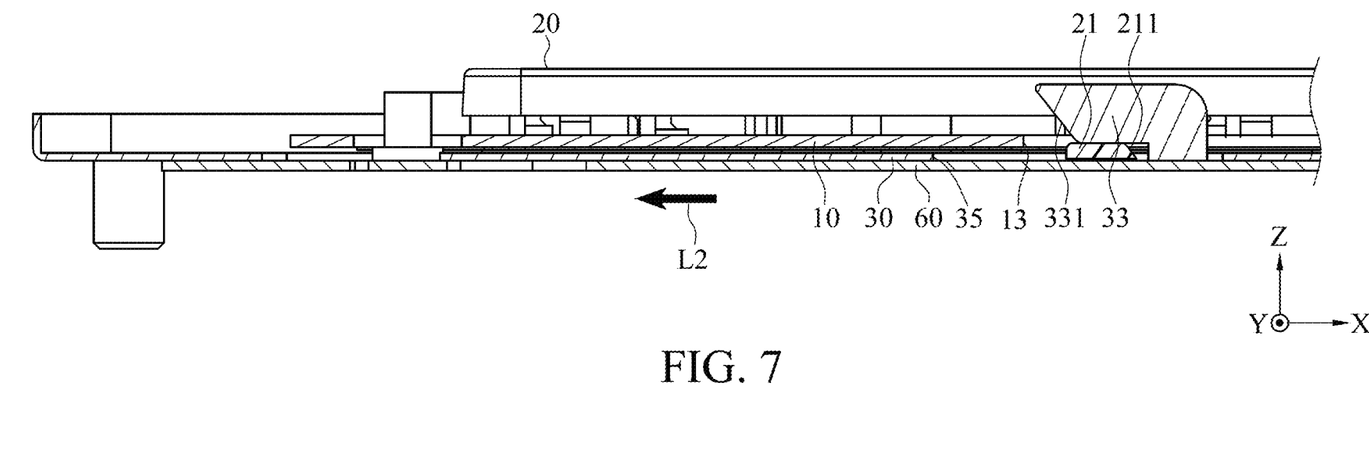
FIG. 7 illustrates a cross sectional view along line 7-7 of FIG. 5.

As shown in FIG. 6 and FIG. 7, in some embodiments, the first guide member 21 of each of the keycaps 20 has a first guide incline 211. Each of the second guide members 33 of the slide plate 30 has a second guide incline 331. While the slide plate 30 slides relative to the substrate 10 along the direction of the long side 31 (as shown by the arrow L2), the first guide incline 211 of each of the first guide members 21 correspondingly abuts against the second guide incline 331 of each of the second guide members 33. As a result, the first guide member 21 of each of the keycaps 20 and each of the second guide members 33 abut against each other by inclines, such that the contact friction is significantly reduced to save more effort.

Figure 8:
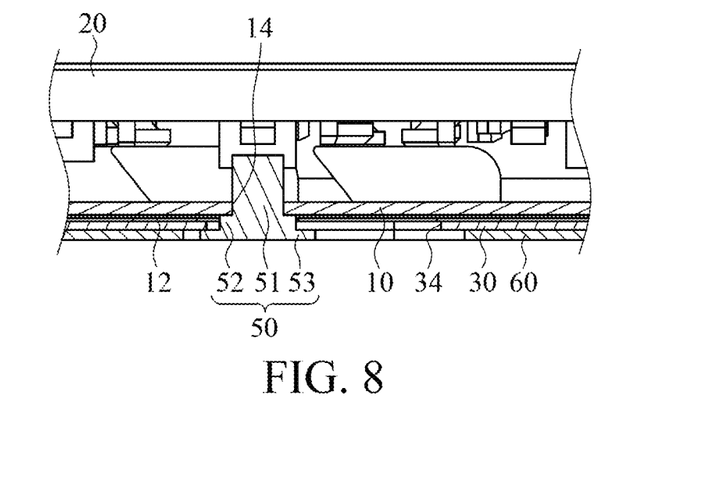
FIG. 8 illustrates a cross sectional view along line 8-8 of FIG. 4.

As shown in FIG. 2, FIG. 4, and FIG. 8, in an embodiment, the slide plate 30 is further provided with a plurality of long slots 34 along the direction of the long side 31 (as the direction of X axis in the drawing). Each of the long slots 34 is penetrated by a guide rod member 50. As a result, while the slide plate 30 slides relative to the substrate 10, it is ensured that the slide plate 30 can slide along the direction of the long side 31 in a linear manner by the guidance of the guide rod member 50. In addition, the slide plate 30 can be restricted on the direction of the short side 32 (i.e., the direction of Y axis) to prevent the slide plate 30 from shifting or swaying.

As shown in FIG. 2 and FIG. 8, in an embodiment, each of the guide rod members 50 has a fixing rod segment 51 and a guide rod segment 52. An outer diameter of the guide rod segment 52 is greater than that of the fixing rod segment 51, such that a cross section of the guide rod member 50 is of a step shape. The fixing rod segment 51 of each of the guide rod members 50 is to be fixed to the substrate 10. For instance, the fixing rod segment 51 is a screw rod segment. The substrate 10 is provided with screw holes 14 respectively corresponding to each of the fixing rod segments 51, such that each of the guide rod members 50 can be screwed into each of the screw holes 14 of the substrate 10 by the fixing rod segments 51. The guide rod segment 52 is in the long slot 34 and is correspondingly against the bottom surface 12 of the substrate 10 to achieve the fixation effect. As a result, each of the guide rod members 50 can fix the substrate 10 and guide the slide plate 30. Nonetheless, the embodiment is merely illustration. In other embodiments, the fixing rod segments 51 can be fixed to the substrate 10 by other measures such as coupling or riveting.

As shown in FIG. 8, in an embodiment, each of the guide rod members 50 further has a rod head 53. The guide rod segment 52 is connected between the fixing rod segment 51 and the rod head 53. An outer diameter of the rod head 53 is greater than that of the guide rod segment 52. The slide plate 30 is against between the rod head 53 of each of the guide rod members 50 and the substrate 10 with a predetermined tolerance without fixation, such that the slide plate 30 can be restricted while having capability of sliding relative to the substrate 10 and each of the guide rod members 50.

Figure 9:
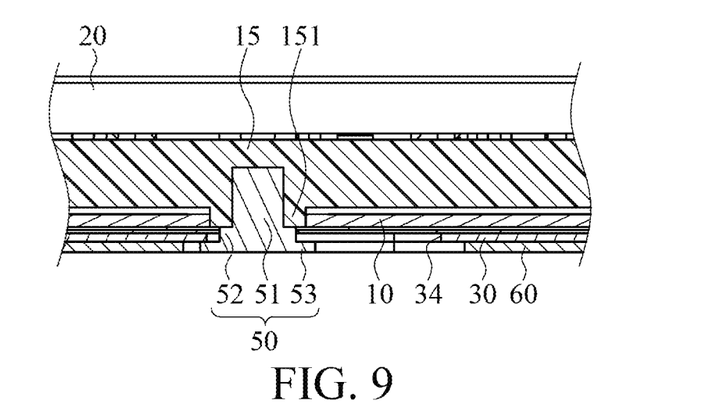
FIG. 9 illustrates a cross sectional view of a part of a sinkable keyboard device according to another embodiment of the instant disclosure.

As shown in FIG. 9, in another embodiment, each of the guide rod members 50 can be used to be fixed to the cover plate 15. In the embodiment, the surface of the cover plate 15 close to the substrate 10 is provided with a plurality of fixing members 151 for the assembling of each of the guide rod members 50. For instance, each of the fixing members 151 may be a screw hole, and the fixing rod segment 51 of each of the guide rod members 50 may be a screw rod segment, such that each of the guide rod members 50 can be screwed to the fixing members 151 of the cover plate 15 by the fixing rod segment 51, and the guide rod segment 52 is in the long slot 34. As a result, each of the guide rod members 50 can fix the cover plate 15 and guide the slide plate 30. In other embodiments, the fixing rod segment 51 can be fixed to the cover plate 15 by other measures such as coupling or riveting.

Nonetheless, the embodiment is merely illustration. In other embodiments, the substrate 10, the cover plate 15, and the slide plate 30 can be respectively assembled to different structures.

As shown in FIG. 2, FIG. 6, and FIG. 7, in an embodiment, a downside of the slide plate 30 is provided with a backlight plate 60. The backlight plate 60 may be made by light guide material and has a capability of guiding light rays. For instance, the backlight plate 60 can be, but not limited to, a plate made by polycarbonate (PC), acrylic plastic (PMMA), or glass material. The backlight plate 60 may be an electroluminescent plate or another plate as a backlight source. The slide plate 30 is provided with a plurality of light transmission holes 35 respectively corresponding to the keycaps 20. While external light rays (e.g., light rays emitted by LEDs positioned close to the backlight plate 60) enter the backlight plate 60, the backlight plate 60 can make the light ray transmitted upwards to pass through the light transmission holes 35 to illuminate each of the keycaps 20; therefore, the light rays can be emitted from each of the keycaps 20, which is benefit to the use of the sinkable keyboard device 1 in an environment with insufficient brightness.

As shown in FIG. 2, FIG. 6, and FIG. 7, in an embodiment, the backlight plate 60 can be fixed to the downside of the slide plate 30. For instance, the backlight plate 60 is adhered or screwed to the surface of the slide plate 30. As a result, by the backlight plate 60 being fixed below the slide plate 30, a better light guide effect can be achieved by the backlight plate 60 without any breach thereon for avoiding additional components. In addition, during the slide plate 30 sliding relative to the substrate 10, the interference or abrasion of the slide plate 30 and the backlight plate 60 can be avoided, and their life can be longer.

While the instant disclosure has been described by way of example and in terms of the preferred embodiments, it is to be understood that the instant disclosure needs not be limited to the disclosed embodiments. For anyone skilled in the art, various modifications and improvements within the spirit of the instant disclosure are covered under the scope of the instant disclosure. The covered scope of the instant disclosure is based on the appended claims.

What is claimed is:

1. A sinkable keyboard device, comprising:
   a substrate;
   a plurality of keycaps disposed above the substrate and capable of lifting and sinking, each of the keycaps being provided with a first guide member;
   a slide plate disposed below and in parallel with the substrate, the slide plate comprising a long side and a short side connected to the long side, the slide plate being provided with a plurality of second guide members respectively corresponding to the first guide members of the keycaps; and
   a driving member disposed on the short side of the slide plate, the driving member comprising a driving motor, the driving motor driving the slide plate to slide relative to the substrate along the long side to make the second guide members respectively against the first guide members of the keycaps to drive the keycaps to relatively sink;
   wherein the substrate is provided with a plurality of through holes, and the second guide members of the slide plate respectively penetrate through the through holes to respectively correspond to the first guide members of the keycaps, the slide plate is further provided with a long slot along the long side, and the long slot is penetrated by a guide rod member, an upside of the substrate is provided with a cover plate, the guide rod member comprises a fixing rod segment and a guide rod segment, the fixing rod segment is fixed to the substrate or the cover plate, an outer diameter of the guide rod segment is greater than that of the fixing rod segment, and the guide rod segment is in the long slot.

2. The sinkable keyboard device of claim 1, wherein the driving motor is close to a center of the short side.

3. The sinkable keyboard device of claim 1, wherein a downside of the slide plate is provided with a backlight plate, and the slide plate is provided with a plurality of light transmission holes corresponding to the keycaps.

4. The sinkable keyboard device of claim 3, wherein the backlight plate is fixed to the slide plate.

5. A sinkable keyboard device, comprising:
   a substrate;
   a plurality of keycaps disposed above the substrate and capable of lifting and sinking, each of the keycaps being provided with a first guide member;
   a slide plate disposed below and in parallel with the substrate, the slide plate comprising a long side and a short side connected to the long side, the slide plate being provided with a plurality of second guide members respectively corresponding to the first guide members of the keycaps; and
   a driving member disposed on the short side of the slide plate, the driving member comprising a driving motor, the driving motor driving the slide plate to slide relative to the substrate along the long side to make the second guide members respectively against the first guide members of the keycaps to drive the keycaps to relatively sink;
   wherein the driving member comprises a driving rod, the driving rod is connected between the short side and the driving motor, and the driving motor drives the driving rod to move relative to the slide plate along the short side to drive the slide plate to slide relative to the substrate along the long side by the driving rod,
   wherein the driving rod is provided with a gear rack, the gear rack extends along the short side, and the driving motor has a transmission gear to engage with the gear rack.

6. A sinkable keyboard device, comprising:
   a substrate;
   a plurality of keycaps disposed above the substrate and capable of lifting and sinking, each of the keycaps being provided with a first guide member;
   a slide plate disposed below and in parallel with the substrate, the slide plate comprising a long side and a short side connected to the long side, the slide plate being provided with a plurality of second guide members respectively corresponding to the first guide members of the keycaps; and
   a driving member disposed on the short side of the slide plate, the driving member comprising a driving motor, the driving motor driving the slide plate to slide relative to the substrate along the long side to make the second guide members respectively against the first guide members of the keycaps to drive the keycaps to relatively sink;
   wherein the driving member comprises a driving rod, the driving rod is connected between the short side and the driving motor, and the driving motor drives the driving rod to move relative to the slide plate along the short side to drive the slide plate to slide relative to the substrate along the long side by the driving rod,
   wherein the driving rod is provided with a slide rail extending along the short side, the short side of the slide plate is provided with a slide block to be correspondingly slidably disposed in the slide rail, the slide rail has a first end and a second end, and the first end is close to the slide plate relative to the second end.

* * * * *